United States Patent
Kirikova et al.

(10) Patent No.: US 9,286,486 B2
(45) Date of Patent: Mar. 15, 2016

(54) SYSTEM AND METHOD FOR COPYING FILES BETWEEN ENCRYPTED AND UNENCRYPTED DATA STORAGE DEVICES

(71) Applicant: Kaspersky Lab ZAO, Moscow (RU)

(72) Inventors: Evgeniya P. Kirikova, Moscow (RU); Alexander N. Makarov, Moscow (RU); Damir R. Shiyafetdinov, Moscow (RU)

(73) Assignee: Kaspersky Lab AO, Moscow (RU)

( * ) Notice: Subject to any disclaimer, the term of this patent is extended or adjusted under 35 U.S.C. 154(b) by 0 days.

(21) Appl. No.: 14/206,359

(22) Filed: Mar. 12, 2014

(65) Prior Publication Data

US 2015/0121089 A1   Apr. 30, 2015

(30) Foreign Application Priority Data

Oct. 24, 2013 (RU) .................... 2013147290

(51) Int. Cl.
*G06F 17/00* (2006.01)
*H04L 29/06* (2006.01)
*G06F 21/62* (2013.01)
*G06F 21/60* (2013.01)

(52) U.S. Cl.
CPC ........ *G06F 21/6218* (2013.01); *G06F 21/6209* (2013.01); *H04L 63/107* (2013.01); *G06F 21/60* (2013.01); *G06F 21/606* (2013.01); *G06F 21/62* (2013.01); *H04L 63/0428* (2013.01); *H04L 63/10* (2013.01)

(58) Field of Classification Search
CPC ....... G06F 21/60; G06F 21/606; G06F 21/21; G06F 21/2107; G06F 21/62; G06F 21/6209; G06F 21/6218; H04L 63/0428; H04L 63/10; H04L 63/107

USPC .......................... 726/1, 26–30; 713/164–165
See application file for complete search history.

(56) References Cited

U.S. PATENT DOCUMENTS

| | | | |
|---|---|---|---|
| 6,704,849 B2 * | 3/2004 | Steegmans | 711/162 |
| 6,978,376 B2 | 12/2005 | Giroux et al. | |
| 7,681,044 B2 | 3/2010 | Goto | |
| 8,024,582 B2 * | 9/2011 | Kunitz | G06F 21/6218 380/277 |

(Continued)

FOREIGN PATENT DOCUMENTS

| | | |
|---|---|---|
| RU | 2298824 C2 | 12/2005 |
| RU | 84594 | 7/2009 |
| WO | 2012138804 A2 | 10/2012 |

OTHER PUBLICATIONS

Mengqi Zeng, "Efficient Authenticated Encryption for Hybrid Hard Drives Based on GCM", High Performance Computing and Communications, 2008. HPCC '08. 10th IEEE International Conference.*

(Continued)

*Primary Examiner* — Jayesh Jhaveri
(74) *Attorney, Agent, or Firm* — Arent Fox LLP; Michael Fainberg

(57) ABSTRACT

Disclosed are systems, methods and computer program products for copying encrypted and unencrypted files between data storage devices. In one aspect, the system detects a request to copy a file from a first data storage device to a second data storage device, determines one or more parameters of the copied file, the first data storage device and the second data storage device, selects, based on the one or more parameters, a file encryption policy for the copies file, and applies the selected encryption policy to the copied file.

18 Claims, 3 Drawing Sheets

(56) References Cited

U.S. PATENT DOCUMENTS

| | | | |
|---|---|---|---|
| 8,205,078 B2* | 6/2012 | Bhogal et al. | 713/165 |
| 8,332,907 B2* | 12/2012 | Canning et al. | 726/1 |
| 8,341,404 B2* | 12/2012 | Burchett et al. | 713/165 |
| 8,850,516 B1* | 9/2014 | Hrebicek | G06F 17/30117 707/610 |
| 2004/0221172 A1 | 11/2004 | Stamos et al. | |
| 2006/0031923 A1* | 2/2006 | Kanai | G06F 21/10 726/1 |
| 2006/0294373 A1* | 12/2006 | Stamos et al. | 713/165 |
| 2008/0066150 A1* | 3/2008 | Lim | G06F 17/3089 726/1 |
| 2008/0263355 A1* | 10/2008 | Witt et al. | 713/165 |
| 2009/0262936 A1* | 10/2009 | Cho et al. | 380/255 |
| 2009/0274300 A1* | 11/2009 | Tou et al. | 380/255 |
| 2011/0040964 A1 | 2/2011 | Nussbaum et al. | |
| 2011/0060915 A1* | 3/2011 | Tal | G06F 21/6218 713/189 |
| 2011/0219048 A1* | 9/2011 | Cross | G06F 12/00 707/821 |
| 2012/0297189 A1 | 11/2012 | Hayton et al. | |
| 2013/0159701 A1* | 6/2013 | Phillips et al. | 713/155 |
| 2013/0275747 A1 | 10/2013 | Brumbakc et al. | |
| 2014/0046906 A1* | 2/2014 | Patiejunas | G06F 17/30073 707/661 |
| 2014/0165134 A1* | 6/2014 | Goldschlag | H04L 63/20 726/1 |
| 2014/0223176 A1* | 8/2014 | Hajost et al. | 713/165 |

OTHER PUBLICATIONS

"FLE and FDE encryption technologies", Jul. 15, 2012, XP055128206, Retrieved from the Internet: URL:http://www.kaspersky.com/images/Kasper.

* cited by examiner

SYSTEM AND METHOD FOR COPYING FILES BETWEEN ENCRYPTED AND UNENCRYPTED DATA STORAGE DEVICES

CROSS-REFERENCE TO RELATED APPLICATIONS

This application claims benefit of priority under 35 U.S.C. 119(a)-(d) to a Russian Application No. 2013147290 filed on Oct. 24, 2013, which is incorporated by reference herein.

TECHNICAL FIELD

The present disclosure generally relates to the field of computer security, and more specifically to systems and methods for copying encrypted and unencrypted files between encrypted and unencrypted data storage devices.

BACKGROUND

In modern society, the demand for information security of corporate networks and its users is constantly growing. Data theft and leaks from corporate networks have increased in frequency, and the financial losses cause substantial harm to businesses. Due to vulnerabilities in software and human factors, data transmitted on a corporate network can be intercepted by malware and hackers. Therefore, the encrypting of data on workstations, notebook computers, mobile devices and removable storage media used in corporate networks becomes necessary.

The classic system for encryption of files and directory contents on computers operates in accordance with file access policies that determine which groups of files must be encrypted and which files may not. In such a system, the most vulnerable and critical files (such as files containing confidential information whose loss is undesirable to its owner) are typically encrypted on a disk, and if an application tries to gain access to such files, the system either provides them to the authorized application in decrypted form or blocks access to them.

However, when an authorized application opens an encrypted file, it can transfer the file outside the corporate network, which may cause data leaks. Therefore, there is a need for an improved technique for controlling access to encrypted files on corporate networks.

Another known technique of protecting data is full disk encryption, where all the contents of a disk are encrypted as a whole. In such a case, access to individual files of the encrypted disk occurs by means of decrypting data "on the fly"—the individual disk sectors containing the requested file are decrypted in the computer memory, so the data stored on the disk remains encrypted. Upon completion of working with the file, it is likewise encrypted "on the fly"—the file is broken up into parts equal in volume to a disk sector, which are encrypted and stored in original disk sectors. However, having gained access to a file, it can be stored on a different disk where the encryption policies do not apply, so that there is a risk of losing critical files.

Even so, the existing technologies do not solve the problem of protecting files during their copying from a disk encrypted with the use of full disk encryption technology.

SUMMARY

Disclosed are systems, methods and computer program products for copying encrypted and unencrypted files between data storage devices. In various aspect, the system, method and computer program product include detecting a request to copy a file from a first data storage device to a second data storage device, determining one or more parameters of the copied file, the first data storage device and the second data storage device, selecting, based on the one or more parameters, a file encryption policy for the copies file, and applying the selected encryption policy to the copied file.

In one example aspect, the parameters of the file may include at least one of metadata of the file and attributes of the file. The metadata may include of an indicator of whether the file is encrypted, an indicator of access rights to the file, a type of the file, a size of the file, an owner of the file, and a check sum of the file. The attributes may include at least one of an indicator of whether the file is a system file, a read only file, and a hidden file.

In one example aspect, the selection of a file encryption policy may be further based on a disk encryption policy of the first data storage device and/or the second data storage device. For example, the disk encryption policy may specify whether a data storage device uses one of a Full Disk Encryption (FDE) and a File-Level Encryption (FLE).

In one example aspect, a file encryption policy may further specify an allowed file access rights, including at least one of read only, and read and write.

In another example aspect, a file encryption policy may further specify one or more users or types of user accounts allowed to copy the file between the first and second data storage devices and file encryption requirements for said users or types of user accounts.

In one example aspect, applying the file encryption policy may include one of copying the file encrypted, copying the file unencrypted, and prohibiting the copying of the file.

The above simplified summary of example aspect(s) serves to provide a basic understanding of the invention. This summary is not an extensive overview of all contemplated aspects of the invention, and is intended to neither identify key or critical elements of all aspects nor delineate the scope of any or all aspects. Its sole purpose is to present one or more aspects in a simplified form as a prelude to the more detailed description of the invention that follows. To the accomplishment of the foregoing, the one or more aspects comprise the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Example aspects of the present invention are described herein in the context of systems, methods and computer program products for copying encrypted and unencrypted files between encrypted and unencrypted data storage devices. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
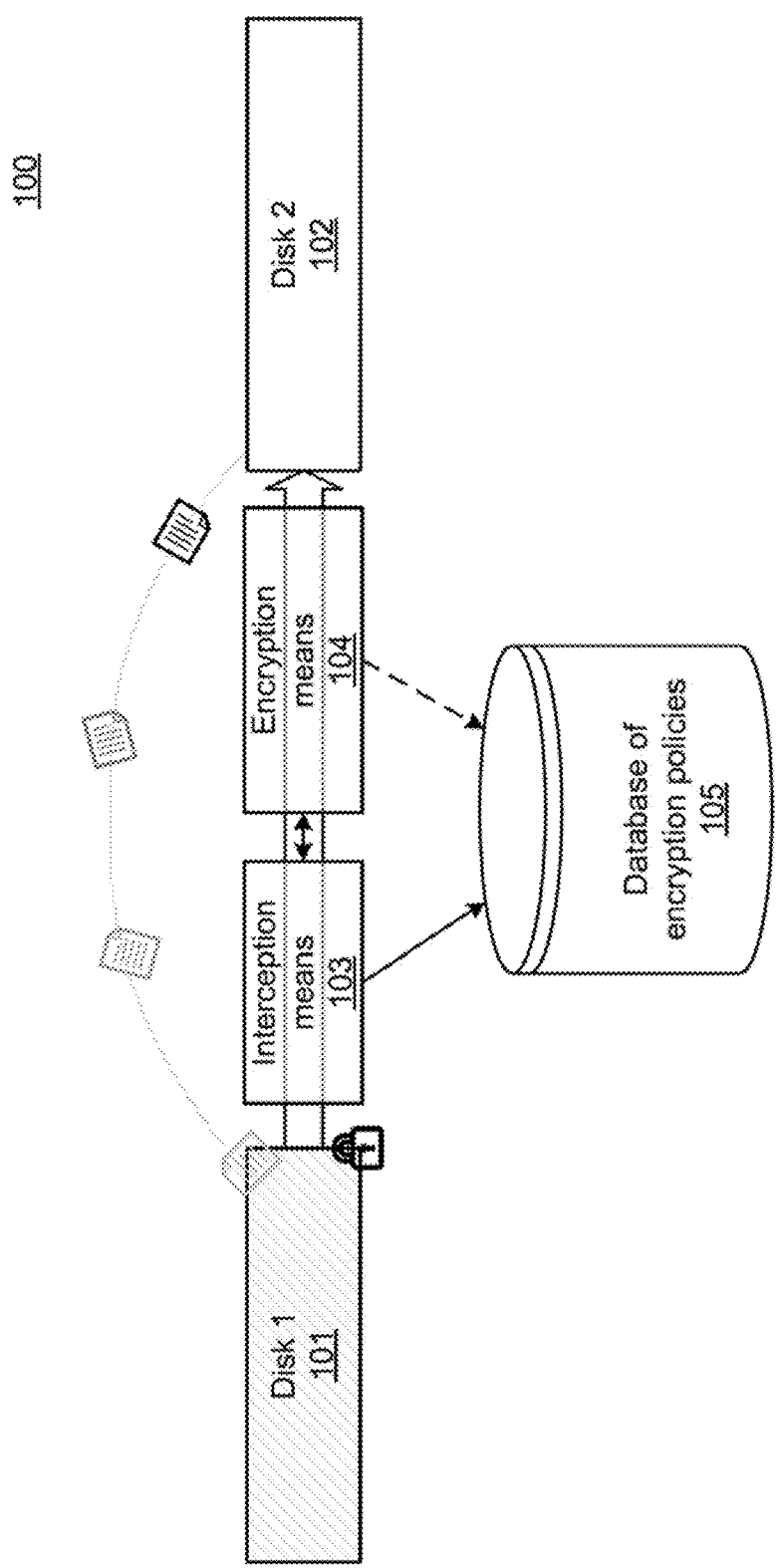
FIG. 1 illustrates a block diagram of an example system for copying files between data storage devices according to aspects of the present invention.

FIG. 1 illustrates an example system for copying files according to aspects of the present invention. In one example aspect, system 100 may contain at least two data storage devices—a first data storage device 101 and a second data storage device 102. The first data storage device 101 may be encrypted with the use of full disk encryption technology. The second data storage device 102 may not be encrypted with a full disk encryption, but certain files on the second data storage device 102 may still be encrypted. The data storage devices 101 and 102 may, for example, each be a hard disk drive (HDD), Random Access Memory (RAM), or any storage device capable of storing data. It should be noted that both data storage devices 101, 102 may physically reside on the same computer or on different computers connected to each other by a network, such as a local area network or the Internet. The data storage devices 101, 102 may also be removable storage media that are connected to the computer, or a cloud-based data storage.

In one aspect, the system 100 may also include an interception module 103, which may be used to intercept file copy operations between the first data storage device 101 and the second data storage device 102, and encryption module 104, connected to the interception module 103 and configured to encrypt files during their copying. The system 100 may also include a database of encryption policies 105, connected to the interception module 103, which contains file encryption policies specifying the encryption and copying rules for the transfer of files between data storage devices, in one aspect, the encryption module 104 may have direct access to the database of encryption policies 105 for determining the file encryption policies.

In one aspect, the file encryption and copying rules specify methods of file transfer between data storage devices may be, for example, as follows: the file should be encrypted during copying, the file should be decrypted during copying, or file copying should be prevented altogether. In another aspect, these rules may further include file access rights that define a list of users or user groups who are allowed access to the file and also the type of such access (such as read only, read and write access, etc.). In yet another aspect, the file encryption policies may depend on the disk encryption policies of the first data storage device 101 and/or the second data storage device 102, on file metadata (such as an indicator of whether the file is encrypted, access rights to the given file, type and size of the file, the file owner, and a check sum of the file), and also on the file attributes (such as "system", "read-only", and "hidden").

The aforementioned disk encryption policies for data storage devices may specify the files and their corresponding rules of encryption/decryption for data storage devices. In one aspect, the rules for data storage devices may depend on various file parameters, such as: access rights to the file, file size, file type, file owner, and check sum of the file. For example, such a rule may define that all files whose owner is the computer administrator and whose size varies from 500 kilobytes to 10 megabytes should be encrypted when performing any operations with the file (such as transfer, modification, etc.).

Figure 2:
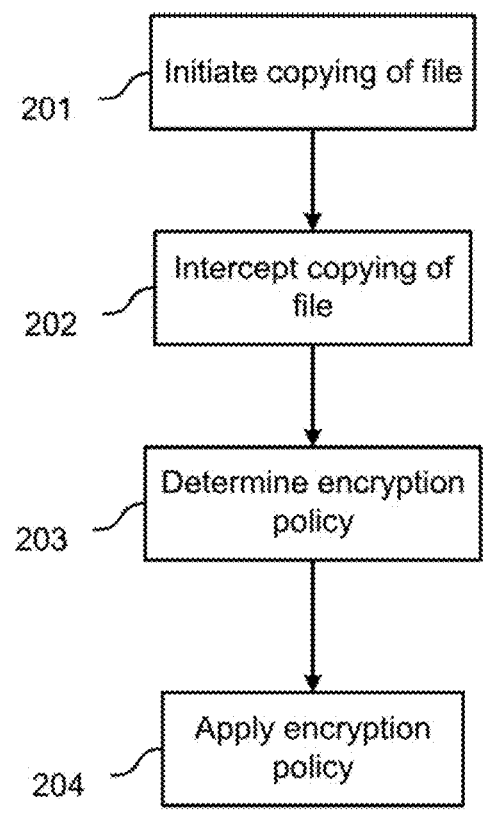
FIG. 2 illustrates a flow diagram of an example method for copying files between data storage devices according to aspects of the present invention.

FIG. 2 illustrates a flow diagram of an example method for copying files according to aspects of the present invention. In particular, the flow diagram shows an example aspect of the method of encryption of files during their copying between data storage devices. The method shown may begin in step 201 with the initiation by the computer user of the copying of a file from the first data storage device 101 to the second data storage device 102. This action may be intercepted by the interception module 103 in step 202. The interception module 103 may then identify the user, the file being copied, and the metadata contained in the file. The interception module 103 may also determine certain parameters of the first data storage device 101 and the second data storage device 102 (for example, the above-described disk encryption policies for the data storage devices, and the information about the computer on which module 103 is installed). Based on these parameters, the interception module may select a file encryption policy from the database of encryption policies 105 which will be applied to the file. In step 204, the interception module 103 may transmit the selected file encryption policy to the encryption module 104, which in turn may apply this encryption policy to the file. In one aspect, if the copying of the file to the second data storage device 102 is successful, the file may be removed from the first data storage device 101, i.e., the copy operation is in fact replaced by a move operation. In another aspect, in step 203 the interception module 103 may provide the above identified parameters to the encryption module 104, which in turn may access to the database 105 to select the appropriate file encryption policy. Then, in step 204, the encryption module 104 may apply the selected encryption policy to the file.

In one aspect, the described scenario may occur in an opposite direction as well—in step 201 the user may initiate the copying of a file from the second data storage device 102 to the first data storage device 101. In this example, the subsequent steps may occur in the same manner as described above. The one difference will be in the choices of the file encryption policies, which may be different from the file encryption policies used for copying files from the encrypted first data storage device 101 to the second data storage device 102.

Examples of file encryption policies are shown below in Table 1. In this example, it is presumed that the first data storage device 101 is encrypted by means of a full disk encryption (FDE) technology. Thus, for example, if the file being copied resides on the first data storage device 101 in encrypted form, condition 1 will be fulfilled, corresponding to a file encryption rule whereby the file will remain encrypted when copied to the second data storage device 102. The access rights to the copied file under this rule may be inherited from the access rights to the file on the first data storage device 101.

TABLE 1

| No | Conditions for the first data storage device 101 | Conditions for the second data storage device 102 | File Encryption Policies |
|---|---|---|---|
| 1 | File being copied is encrypted. | Disk encryption not important. | File will remain encrypted unless clearly belonging to the encryption exceptions. Access rights inherited from |

TABLE 1-continued

| No | Conditions for the first data storage device 101 | Conditions for the second data storage device 102 | File Encryption Policies |
|---|---|---|---|
| 2 | Encrypting of file being copied not important. | Encryption rules using FLE technology are applied on the data storage device. | the access rights of the file on the first data storage device 101. File will be encrypted with FLE technology. Access rights taken from the rules specified for the second data storage device 102. |
| 3 | File being copied is not encrypted by FLE technology. | Data storage device not subject to the encryption rules. | Copying prohibited. |
| 4 | File is found on the list of exceptions, file encryption not important. | Disk encryption not important. | File copied to the second data storage device 102 will be kept in encrypted form. |
| 5 | File has "copying prohibited" attribute | Disk encryption not important. | Copying prohibited. |
| 6 | File has "read only" attribute, computer owner does not have administrator rights. | Disk encryption not important. | File copied to the second data storage device 102 will be kept in encrypted form. |
| 7 | File has "keep unchanged" attribute | Disk encryption not important. | Encryption policies specified on the second data storage device 102 will be extended to file copied onto the second data storage device 102. |
| 8 | File has "always encrypt" attribute | Disk encryption not important. | File copied to the second data storage device 102 will be kept in encrypted form. |

Rule 2 in table 1 will be applied when rules of disk encryption using file-level encryption (FLE) technology are applied on the second data storage device 102. File encryption is not important in this case. According to this rule, the file will be encrypted when copied to the second data storage device 102, and the access rights to the file are determined from the access rights specified on the second data storage device 102.

Rule 3 in table 1 is applied when the file being copied is not encrypted by FLE technology on the first data storage device 101, and the second data storage device 102 is not encrypted either by FDE technology or by FLE technology. In this case, copying of the file will be prohibited.

In a particular case, exceptions may be specified for the encryption rules, such as definite encryption rules will always apply to certain files (e.g., always encrypt when copying), as is shown in rule 4 of table 1.

Rule 5 in table 1 will operate when the file has a "copying prohibited" attribute. In this case, regardless of the applicability of encryption for the second data storage device 102, the copying of the file will be prohibited.

Rule 6 reflects the behavior of the system in the case when the file being copied has a "read only" attribute, and the file owner is not the computer administrator. In this case the rule will operate that the file copied onto the second data storage device 102 will be kept in encrypted form. That is, if the original file was not encrypted, when copied it will be kept in encrypted form on the second data storage device 102. But if the file was kept on the first data storage device 101 in encrypted form, it will be copied to the second data storage device 102 without changes.

According to rule 7, if the file has the "keep unchanged" attribute, when copied to the second data storage device 102 the file will be subjected to the encryption policies operating on the second data storage device 102. For example, if the file was not originally encrypted, but on the second data storage device 102 an encryption policy operates such that this file should be encrypted, then the file will be encrypted. But if, for example, the file was already encrypted on the first data storage device 101, then it will be kept on the second data storage device 102 likewise in encrypted form.

According to rule 8, if the file has an "always encrypt" attribute, then when copied to the second data storage device 102 it will be kept on the disk in encrypted form, even if encryption rules using FLE technology are not operating on the second data storage device 102.

It should be noted that, in a scenario where the copying of a file occurs from the second data storage device 102 to the first data storage device 101 encrypted by FDE technology, the encryption policies may have the same appearance as in table 1. In one aspect, the encryption policies for this case may correspond entirely to the encryption policies defined for files being copied from the first data storage device 101 onto the second data storage device 102. In another aspect, the encryption policies may contain a rule by which the file will be kept on the first data storage device 101 in the decrypted form. Even in this case the level of data security will be increased, since the first data storage device 101 on which the file will be kept is itself encrypted, in yet another aspect, the encryption policies may additionally contain rules for access to the file.

Figure 3:
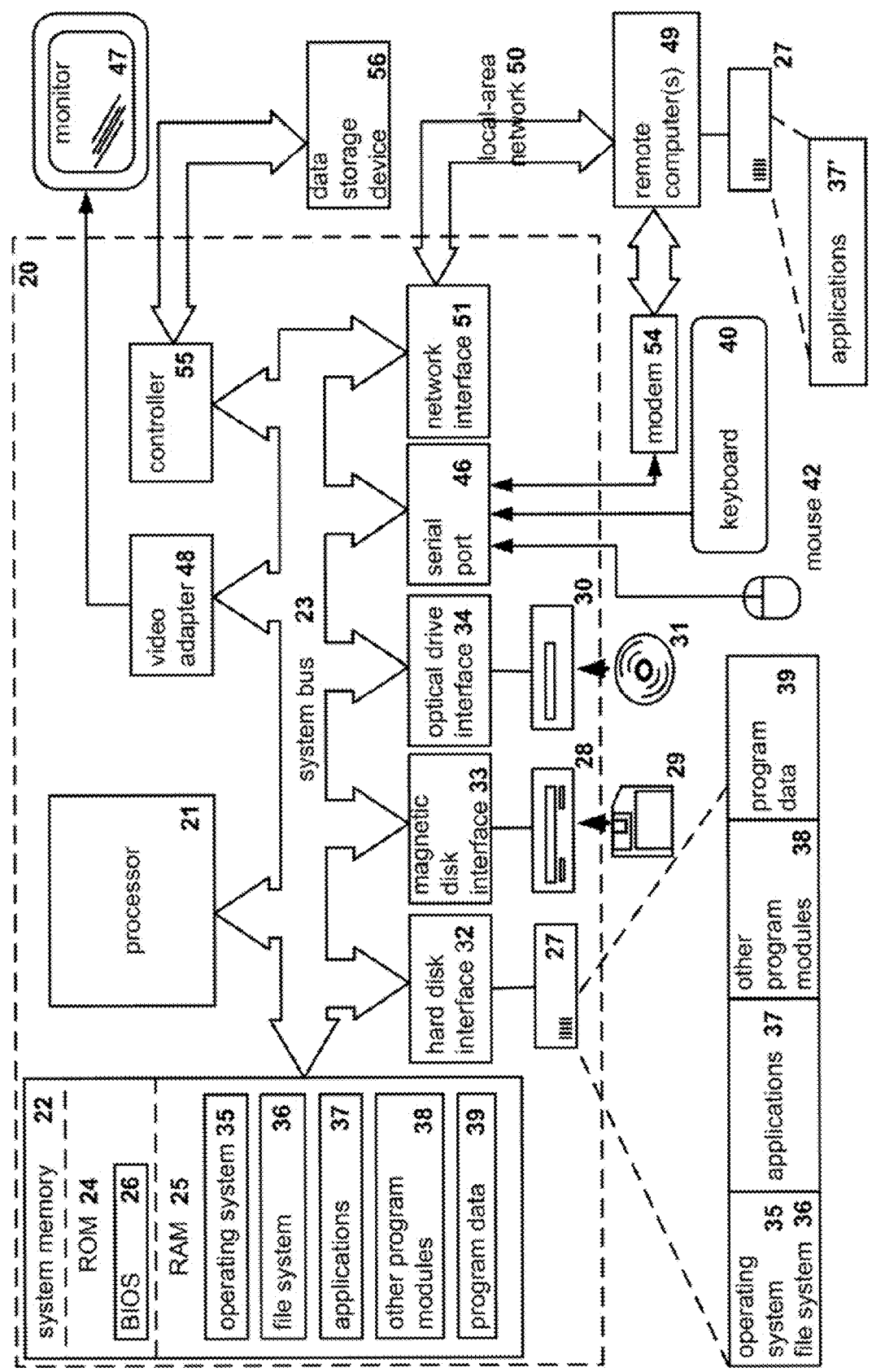
FIG. 3 illustrates a block diagram of an example general-purpose computer system on which the system and method for copying files may be implemented.

FIG. 3 depicts one example aspect of a general-purpose computer system 5 that can be used to implement the disclosed systems and methods for copying files between data storage devices. The computer system 5 may include, but not limited to, a personal computer, a notebook, tablet computer, a smart phone, a network server, a router, or other type of processing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of engine. The term "engine" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor of a general purpose computer (such as the one described in greater detail in FIG. 3 above). Accordingly, the engine can be realized in a variety of suitable configurations, and should not be limited to any particular implementation exemplified herein.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known components referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for copying files between data storage devices, the method comprising:
  detecting, by a hardware processor, a request to copy a file from a first data storage device to a second data storage device, wherein all contents of a memory of at least one of the first and second data storage devices are encrypted as a whole using a Full Disk Encryption (FDE);
  determining, by the hardware processor, one or more parameters of each of the file being copied, the first data storage device and the second data storage device, wherein the one or more parameters of the file comprise metadata of the file including an indicator of access rights to the file, a type of the file, a size of the file, an owner of the file, and a check sum of the file;
  selecting, by the hardware processor, a file encryption policy from a plurality of file encryption policies for the file being copied, based on the one or more parameters of each of the file being copied, the first data storage device and the second data storage device and based on a disk encryption policy of at least one of the first data storage device and the second data storage device, wherein the plurality of file encryption policies are configured to define access rights of the file being copied based at least in part on a current encryption status of the file being copied and each respective encryption policy of the first and second data storage devices; and
  applying, by the hardware processor, the selected file encryption policy to the file being copied.

2. The method of claim 1, wherein the parameters of the file further include attributes of the file, wherein the metadata further includes an indicator of whether the file is encrypted, and wherein the attributes include at least one of an indicator of whether the file is a system file, a read only file, and a hidden file.

3. The method of claim 1, wherein the disk encryption policy specifies whether a data storage device uses one of a Full Disk Encryption (FDE) and a File-Level Encryption (FLE).

4. The method of claim 1, wherein the file encryption policy further specifies an allowed file access rights, including at least one of read only, and read and write.

5. The method of claim 1, wherein the file encryption policy further specifies one or more users or types of user accounts allowed to copy the file between the first and second data storage devices and file encryption requirements for said users or types of user accounts.

6. The method of claim 1, wherein applying the file encryption policy includes one of copying the file encrypted, copying the file unencrypted, and prohibiting the copying of the file.

7. A system for copying files between data storage devices, the system comprising:
- a memory;
- a hardware processor configured to execute instructions stored in the memory, causing the system to:
  - detect a request to copy a file from a first data storage device to a second data storage device, wherein all contents of a memory of at least one of the first and second data storage devices are encrypted as a whole using a Full Disk Encryption (FDE);
  - determine one or more parameters of each of the file being copied, the first data storage device and the second data storage device, wherein the one or more parameters of the file comprise metadata of the file including an indicator of access rights to the file, a type of the file, a size of the file, an owner of the file, and a check sum of the file;
  - select, a file encryption policy from a plurality of file encryption policies for the file being copied, based on the one or more parameters of each of the file being copied, the first data storage device and the second data storage device and based on a disk encryption policy of at least one of the first data storage device and the second data storage device, wherein the plurality of file encryption policies are configured to define access rights of the file being copied based at least in part on a current encryption status of the file being copied and each respective encryption policy of the first and second data storage devices; and
  - apply the selected file encryption policy to the file being copied.

8. The system of claim 7, wherein the parameters of the file further include attributes of the file, wherein the metadata further includes an indicator of whether the file is encrypted, and wherein the attributes include at least one of an indicator of whether the file is a system file, a read only file, and a hidden file.

9. The system of claim 7, wherein the disk encryption policy specifies whether a data storage device uses one of a Full Disk Encryption (FDE) and a File-Level Encryption (FLE).

10. The system of claim 7, wherein the file encryption policy further specifies an allowed file access rights, including at least one of read only, and read and write.

11. The system of claim 7, wherein the file encryption policy further specifies one or more users or types of user accounts allowed to copy the file between the first and second data storage devices and file encryption requirements for said users or types of user accounts.

12. The system of claim 7, wherein applying the file encryption policy includes one of copying the file encrypted, copying the file unencrypted, and prohibiting the copying of the file.

13. A computer program product stored on a non-transitory computer-readable storage medium, the computer program product comprising computer-executable instructions for copying files between data storage devices, including instructions for:
- detecting a request to copy a file from a first data storage device to a second data storage device, wherein all contents of a memory of at least one of the first and second data storage devices are encrypted as a whole using a Full Disk Encryption (FDE);
- determining one or more parameters of each of the file being copied, the first data storage device and the second data storage device, wherein the one or more parameters of the file comprise metadata of the file including an indicator of access rights to the file, a type of the file, a size of the file, an owner of the file, and a check sum of the file;
- selecting, a file encryption policy from a plurality of file encryption policies for the file being copied, based on the one or more parameters of each of the file being copied, the first data storage device and the second data storage device and based on a disk encryption policy of at least one of the first data storage device and the second data storage device, wherein the plurality of file encryption policies are configured to define access rights of the file being copied based at least in part on a current encryption status of the file being copied and each respective encryption policy of the first and second data storage devices; and
- applying the selected file encryption policy to the file being copied.

14. The computer program product of claim 13, wherein the parameters of the file further include attributes of the file, wherein the metadata further includes an indicator of whether the file is encrypted, and wherein the attributes include at least one of an indicator of whether the file is a system file, a read only file, and a hidden file.

15. The computer program product of claim 13, wherein the disk encryption policy specifies whether a data storage device uses one of a Full Disk Encryption (FDE) and a File-Level Encryption (FLE).

16. The computer program product of claim 13, wherein the file encryption policy further specifies an allowed file access rights, including at least one of read only, and read and write.

17. The computer program product of claim 13, wherein the file encryption policy further specifies one or more users or types of user accounts allowed to copy the file between the first and second data storage devices and file encryption requirements for said users or types of user accounts.

18. The computer program product of claim 13, wherein applying the file encryption policy includes one of copying the file encrypted, copying the file unencrypted, and prohibiting the copying of the file.

* * * * *